US010685766B2

(12) United States Patent
Chen et al.

(10) Patent No.: US 10,685,766 B2
(45) Date of Patent: Jun. 16, 2020

(54) METHODS FOR MANUFACTURING AN INSULATED BUSBAR

(71) Applicant: LITTELFUSE, INC., Chicago, IL (US)

(72) Inventors: Jianhua Chen, Sunnyvale, CA (US); Werner Johler, Shanghai (CN); Chun-Kwan Tsang, Morgan Hill, CA (US)

(73) Assignee: LITTELFUSE, INC., Chicago, IL (US)

( * ) Notice: Subject to any disclaimer, the term of this patent is extended or adjusted under 35 U.S.C. 154(b) by 400 days.

(21) Appl. No.: 15/726,632

(22) Filed: Oct. 6, 2017

(65) Prior Publication Data
US 2018/0033525 A1    Feb. 1, 2018

Related U.S. Application Data

(63) Continuation of application No. 15/131,191, filed on Apr. 18, 2016, now abandoned.

(51) Int. Cl.
| | | |
|---|---|---|
| H01B 13/16 | (2006.01) | |
| H01B 1/02 | (2006.01) | |
| H01B 3/40 | (2006.01) | |
| H01B 3/44 | (2006.01) | |
| H01B 3/42 | (2006.01) | |
| H01B 13/00 | (2006.01) | |
| H01B 7/02 | (2006.01) | |
| H01B 3/30 | (2006.01) | |
| H01M 2/20 | (2006.01) | |

(52) U.S. Cl.
CPC ............ *H01B 13/16* (2013.01); *H01B 1/023* (2013.01); *H01B 1/026* (2013.01); *H01B 3/30* (2013.01); *H01B 3/302* (2013.01); *H01B 3/40* (2013.01); *H01B 3/421* (2013.01); *H01B 3/447* (2013.01); *H01B 7/02* (2013.01); *H01B 13/0016* (2013.01); *H01M 2/206* (2013.01)

(58) Field of Classification Search
None
See application file for complete search history.

(56) References Cited

U.S. PATENT DOCUMENTS

| | | | |
|---|---|---|---|
| 2,421,652 A * | 6/1947 | Robinson | ............... C25B 13/00 |
| | | | 428/389 |
| 2,874,085 A | 2/1959 | Brietzke | |
| 3,093,511 A | 6/1963 | Weisel | |

(Continued)

OTHER PUBLICATIONS

International Search Report for the International Patent Application No. PCT/US2017/019686, dated May 18, 2017.

*Primary Examiner* — Kishor Mayekar

(57) ABSTRACT

A method for manufacturing an insulated conductive material, the method including providing a wire, applying a masking material to one or more regions of the wire, coating regions of the wire other than the one or more regions with an insulating material by, electrically charging the wire with a first charge polarity, providing a medium of electrically charged insulating material particles that are charged with an opposite polarity, passing the charged wire through the medium, whereby the insulating material particles bind areas of the conductive material other than the one or more regions, curing the insulating material particles, and applying a solvent to the masking material to thereby remove the masking material, wherein the cured insulated material particles are substantially unaffected by the solvent.

8 Claims, 4 Drawing Sheets

(56) References Cited

U.S. PATENT DOCUMENTS

| | | |
|---|---|---|
| 4,004,447 A | 1/1977 | Wantling |
| 4,199,415 A * | 4/1980 | Sterling ................. C25D 5/022 205/118 |
| 4,417,166 A | 11/1983 | Perucchi et al. |
| 4,510,007 A | 4/1985 | Stucke |
| 4,885,187 A | 12/1989 | Koenig |
| 5,223,104 A | 6/1993 | Grassi et al. |
| 5,736,495 A | 4/1998 | Bolkan et al. |
| 2004/0055892 A1 | 3/2004 | Oh et al. |
| 2006/0086620 A1 | 4/2006 | Chase et al. |
| 2006/0260943 A1 | 11/2006 | Khaselev et al. |
| 2007/0004249 A1 | 1/2007 | Uchiyama et al. |
| 2008/0124089 A1 | 5/2008 | Ishigami et al. |
| 2014/0076613 A1 | 3/2014 | Mahler et al. |
| 2016/0160378 A1 | 6/2016 | Sato et al. |

\* cited by examiner

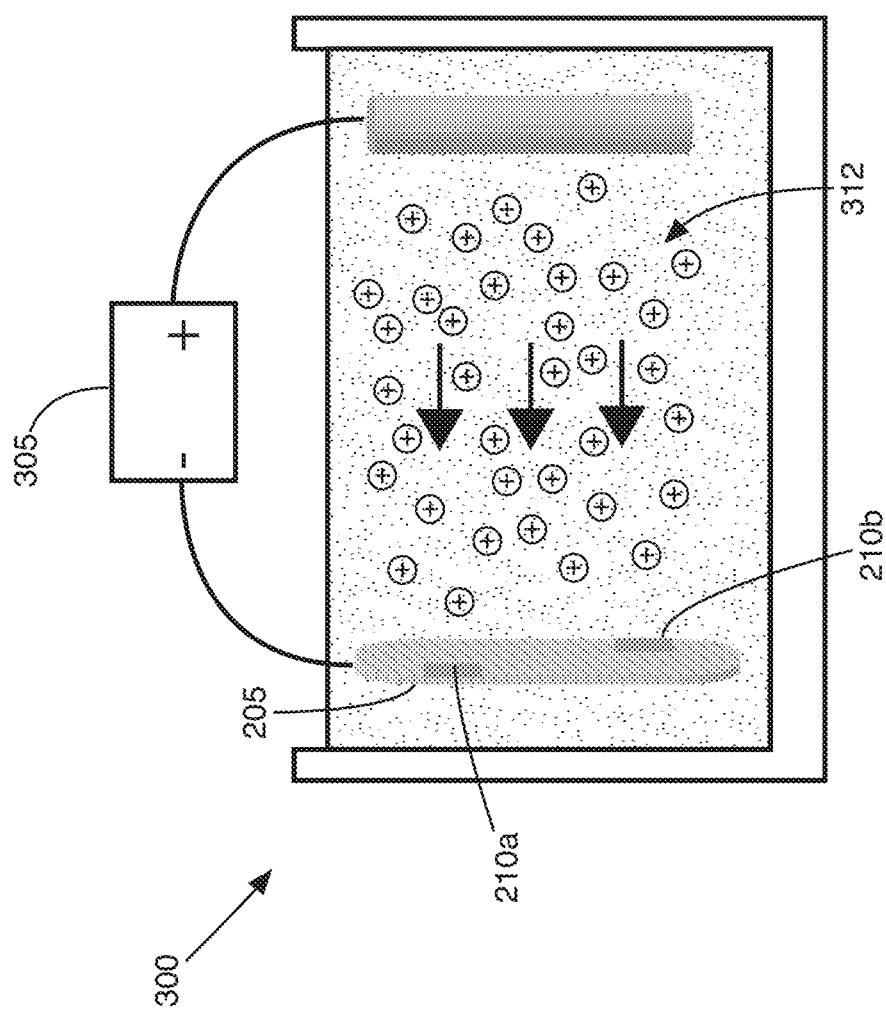

METHODS FOR MANUFACTURING AN INSULATED BUSBAR

CROSS-REFERENCE TO RELATED APPLICATION

This application is a continuation-in-part of U.S. patent application Ser. No. 15/131,191, filed Apr. 18, 2016, the entire contents of which are incorporated herein by reference.

BACKGROUND

The present invention relates generally to insulated conductors. More specifically, the present invention relates to methods for manufacturing insulating bus bars.

DESCRIPTION OF RELATED ART

A typical mobile device may utilize two or more battery cells to provide power to the mobile device. The batteries may be connected in series or parallel configurations via so-called bus bars, which typically correspond to one or more strips of conductive material suitably sized to handle the required amount of current.

Insulation of the bus bar is usually required to prevent a short circuit condition between the bus bar and other electrical components of the mobile device. One method for manufacturing an insulated bus bar includes cutting a length of a conductive material to a desired length and cutting two portions of an insulating material to the same length. For example, the respective components may be cut to a length of 20 cm. The respective portions of insulating material are placed on the top and bottom surfaces of the conductive material, respectively, to insulate the conductive material, and thereby provide an insulated bus bar. In subsequent operations, portions of the insulating material may be removed to expose the conductive material to facilitate making an electrical connection with the bus bar.

Typical methods for removing the insulating material to expose the conductive material require that the portion being removed be on an outward-facing surface. This is the case, for example, when using laser and/or mechanical means to remove the insulating portion because the methods may require direct line of sight to the portion being removed. However, when the insulating portion to be removed is on an inward-facing surface, use of these methods to remove the insulating material may be impractical.

Other problems with existing methods for manufacturing insulated bus bars will become apparent in view of the disclosure below.

SUMMARY

In one aspect, a method for manufacturing an insulated conductive material includes providing a wire, applying a masking material to one or more regions of the wire, coating regions of the wire other than the one or more regions with an insulating material by, electrically charging the wire with a first charge polarity, providing a medium of electrically charged insulating material particles that are charged with an opposite polarity, passing the charged wire through the medium, whereby the insulating material particles bind areas of the conductive material other than the one or more regions, curing the insulating material particles, and applying a solvent to the masking material to thereby remove the masking material, wherein the cured insulated material particles are substantially unaffected by the solvent.

In a second aspect, a method for manufacturing an insulated bus bar includes providing an insulated wire, cutting the insulated wire to a desired length, stripping insulation from portions of the insulated wire, bending the insulated wire into a predetermined shape, and coining portions of the insulated wire from which insulation was stripped.

In a third aspect, a bus bar according to the present disclosure includes a wire, and an insulating material that covers a portion of the wire, wherein other portions of the wire are exposed. At least one of the portions of the wire that is exposed may be located intermediate two portions of the wire that are covered with the insulating material.

BRIEF DESCRIPTION OF THE DRAWINGS

FIG. 3 illustrates an exemplary system for performing an electrophoreses coating operation of the manufacturing process.

DETAILED DESCRIPTION

Methods and systems for manufacturing insulated bus bars are described below.

Figure 1:
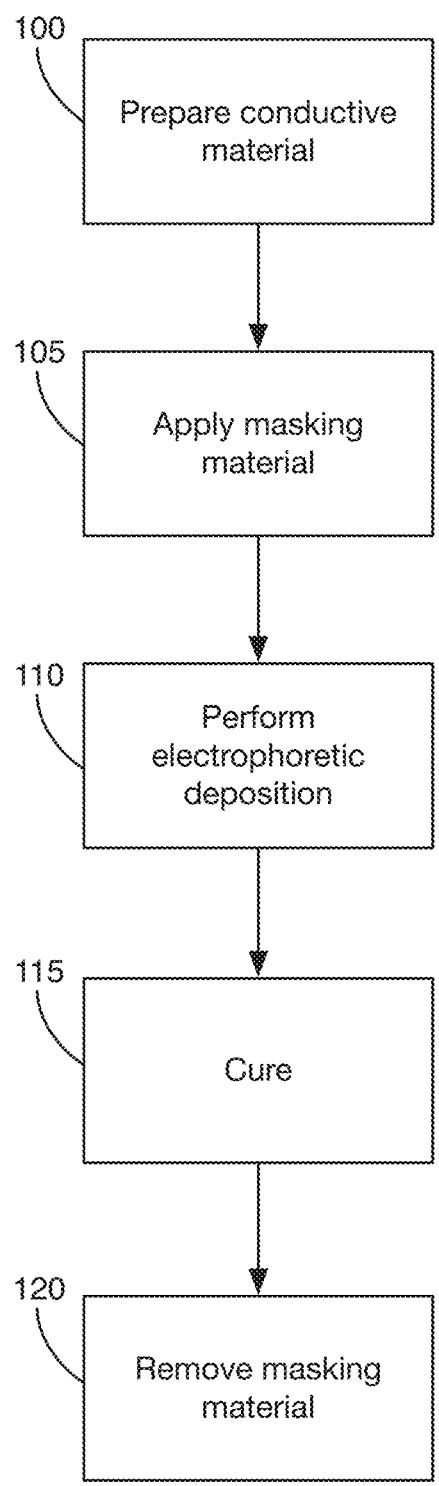
FIG. 1 illustrates exemplary operations for manufacturing an insulated bus bar.

FIG. 1 illustrates exemplary operations for manufacturing an insulated bus bar. At block 100, a conductive material may be provided and/or prepared. The conductive material may correspond to copper and its alloys, aluminum, nickel, silver, stainless steel or a different conductive material.

During preparation, the conductive material may be provided in various forms. For example, the conductive material may be provided in a wire form. The term "wire" as used herein shall be understood to have its ordinary meaning, i.e., metal that has been drawn out into the form of a thin flexible thread or rod, such as may be stored and sold commercially in continuous spools or coils. This is to be contrasted with conductive materials that are typically used in the manufacture of conventional bus bars, which typically include planar sheets of metal that are stamped, cut, or punched to form a planar strip of desired shape.

Wires of various shapes and sizes may be utilized for the conductive material of the present disclosure. For example, wire having a gauge of 0.005 mm or greater may be utilized, and wire having a width of 0.05 mm or greater may be utilized. The cross-sectional shape of the wire may be circular, oval, oblong, or polygonal with an arbitrary number of sides, for example. The edges of the wire may be square, beveled, rounded, etc. The wire may have an electrically insulating coating or may be entirely bare (i.e., with no electrically insulating coating). If the wire is provided with an electrically insulating coating, portions of the coating may be removed during subsequent preparation steps as further described below.

Figure 2A:
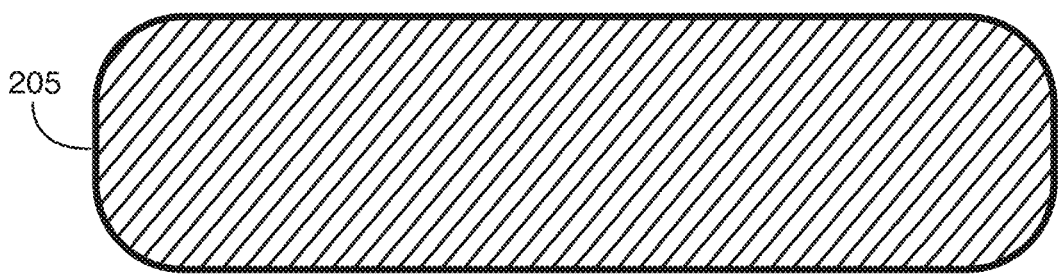
FIGS. 2A-2D illustrate various stages of the bus bar during the manufacturing process of FIG. 1.

Preparation of the conductive material may further include shaping the wire using various processes to achieve a desired shape, such as the shape of the conductive bar illustrated in FIG. 2A. In various examples, the wire may be cut to a desired length. Additionally, portions of the wire may be coined (i.e., flattened via the application of force). Coining may be particularly appropriate for wires having round cross sectional shapes in order to form flat sections or pads in the wire to facilitate welding or soldering, for example. The wire may additionally be shaped, bent, or otherwise mechanically deformed to achieve a desired shape or profile for a bus bar. The wire may additionally be hardened or annealed as required.

Preparation of the conductive material may further include cleaning the wire with an organic solvent or detergent to remove any grease. In some examples, the wire may be cleaned with acid to remove an oxide layer on the outside surface of the conductive material that may interfere with an electrophoreses coating operation that will be described below. Other pretreatment processes, such as surface phosphating, maybe applied prior to electrophoretic coating.

If the wire includes an electrically insulating coating, preparation of the conductive material may further include removal or stripping of some or all of the insulating coating. For example, the electrically insulating coating may be stripped from portions of the wire that are to be soldered, welded, or otherwise electrically connected to other electrical components, while the electrically insulating coating on other portions of the wire may be left intact. If the selected wire is entirely bare and does not include an electrically insulating coating, the wire may be subjected to an electrophoreses coating operation for applying an electrically insulating coating to portions of the wire as outlined in blocks 105-120 of the exemplary method depicted in FIG. 1 and as described below.

Figure 2B:
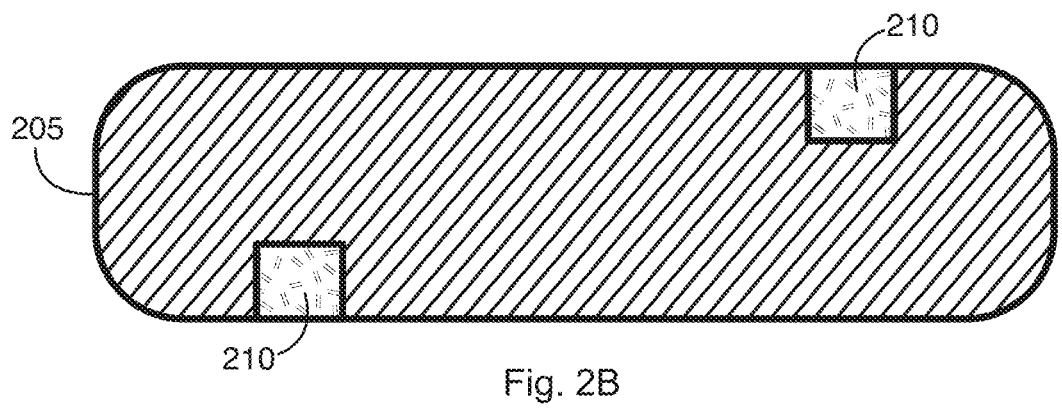

At block 105 of the exemplary method of the present disclosure, a masking material may be applied to one or more regions of the conductive material to prevent insulating material from being deposited on those regions in subsequent operations. For example, as illustrated in FIG. 2B, masking material 210 may be applied to the surface of the conductive material 205. The masking material 210 may correspond to an electrical insulating material. For example, the masking material 210 may correspond to a photoresist material such as poly(methyl methacrylate), SU-8, poly (methyl glutarimide), phenol formaldehyde resin, a polymer material such as polyethylene, ethylene vinyl acetate, silicone, a dielectric material such as silica, metal oxide, or a different material with similar masking properties.

In some implementations, the solvent referred to above for cleaning the conductive material may be applied after the masking material 210 is applied. In this regard, the masking material 210 may be selected so as not to be affected by the solvent. For example, where the solvent is acid based, the selected masking material may be impervious to acids. Where the solvent is alkali based, the selected masking material may be impervious to alkali-based solvents.

The masking material 210 may be applied via a printing process whereby a printer sprays the masking material 210 through nozzles onto the conductive material 200. In other implementations, the masking material 210 may be applied via a roller saturated with the masking material 210. The masking material 210 may also be applied via mechanical brushing. In yet other implementations, the masking material 210 may be applied via a screening process.

The masking material 210 may be cured after application. For example, the masking material 210 may be air-dried or baked, subjected to UV rays, or an electron beam to cure the masking material. In some implementations, the masking material 210 may be baked at a temperature of 110° C. for 10 minutes to cure the masking material 210.

At block 110, the conductive material 205 with the applied and cured masking material 210 may be placed in an insulation deposition chamber, such as the insulation deposition chamber 300 illustrated in FIG. 3. Referring to FIG. 3, the insulation deposition chamber 300 utilizes a cathodic electrodeposition method in which colloidal insulating material particles 312 are suspended in a liquid medium, such as an acrylic-based resin. The medium is coupled to a first polarity of a DC power source 305. The opposite polarity of the DC power source 305 is electrically coupled to the conductive material 205. The DC power source 305 may generate a voltage of about 20-80 Vdc. The insulating material particles 312 in the medium migrate under the influence of the electric field generated by the DC power source 305 to the outside surface of the conductive material 106 to thereby cover any areas of the outside surface of the conductive material 106 that are electrically exposed with the colloidal insulating material particles 312.

The insulating material particles 312 may correspond to any colloidal particles capable of forming a stable suspension, which can carry a charge. For example, the insulating material particles 312 may correspond to various polymers, pigments, dyes, and ceramics. Different materials with similar properties may be utilized.

The process above is capable of producing an insulation layer 215 (FIG. 2C) on the conductive material 205 having a thickness of least 0.014 mm, a leakage current of less than 10 mA, and an insulation resistance of at least 100 MΩ when measured with 500V DC applied across the insulation. In addition, the insulation layer 215 maintains an ISO grade 0 cross-hatch adhesion rating to the conductive material 205 after being exposed to an environment of 60° C. having a relative humidity of 95% for 500 hours, and after temperature cycling one hundred times between −40° C. and 90° C.

Figure 2C:
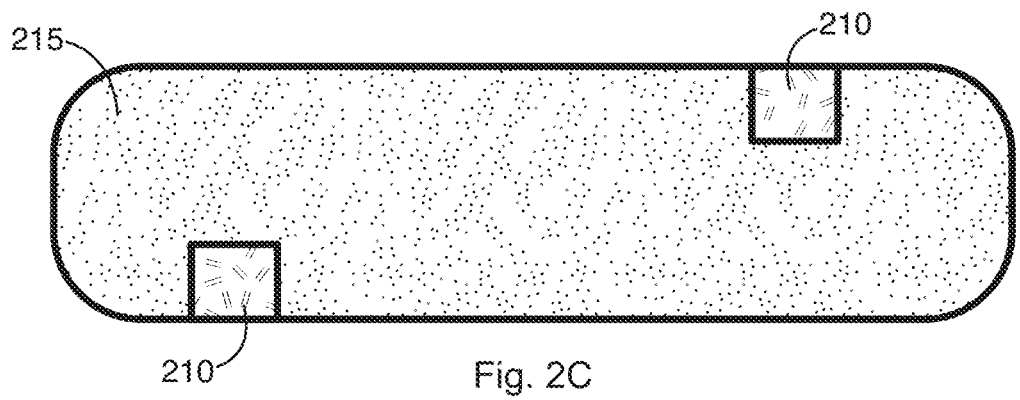

Returning to FIG. 1, at block 115, after the desired thickness of insulating material is deposited on the conductive material 205, the coated conductive material 205 is removed from the deposition chamber 300 and then subjected to a curing process. As illustrated in FIG. 2C, upon removal from the deposition chamber 300, an insulation layer 215 is formed on all regions of the conductive material 205 except for those regions covered by the masking material 210.

During curing, heat may be applied to the insulated conductive material to accelerate the removal of any solvents present in the colloidal insulating material particles of the insulation layer 215. The heat may also cause the colloidal insulating material particles of the insulation layer 215 to disperse evenly around the outside surface of the conductive material 205, to thereby form a lasting bond between the insulation layer 215 and the conductive material 205. The heat may also cause chemical crosslinking of the insulation layer to have better stability. In one implementation, the insulated conductive material may be heated to a temperature of about 180° C. for a period of 30 minutes.

Figure 2D:
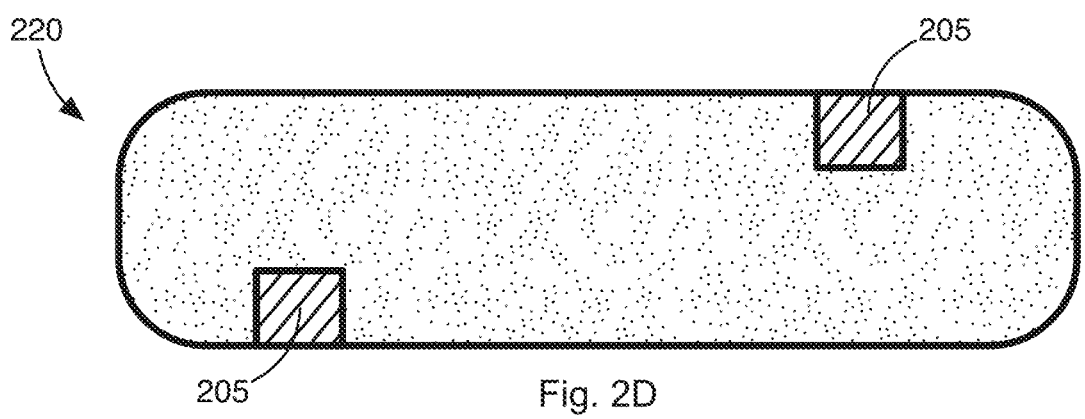

At block 120, the masking material 210 may be removed to expose one or more regions of conductive material 205, as illustrated in FIG. 2D. In one implementation, a solvent different from the solvent utilized above for preparing the conductive material such as dilute sulfuric acid may be utilized. For example, where the solvent used for cleaning the conductive material is acid based, the solvent used for removal of the masking material may correspond to an alkali-based solvent, and vice versa.

Figure 4:
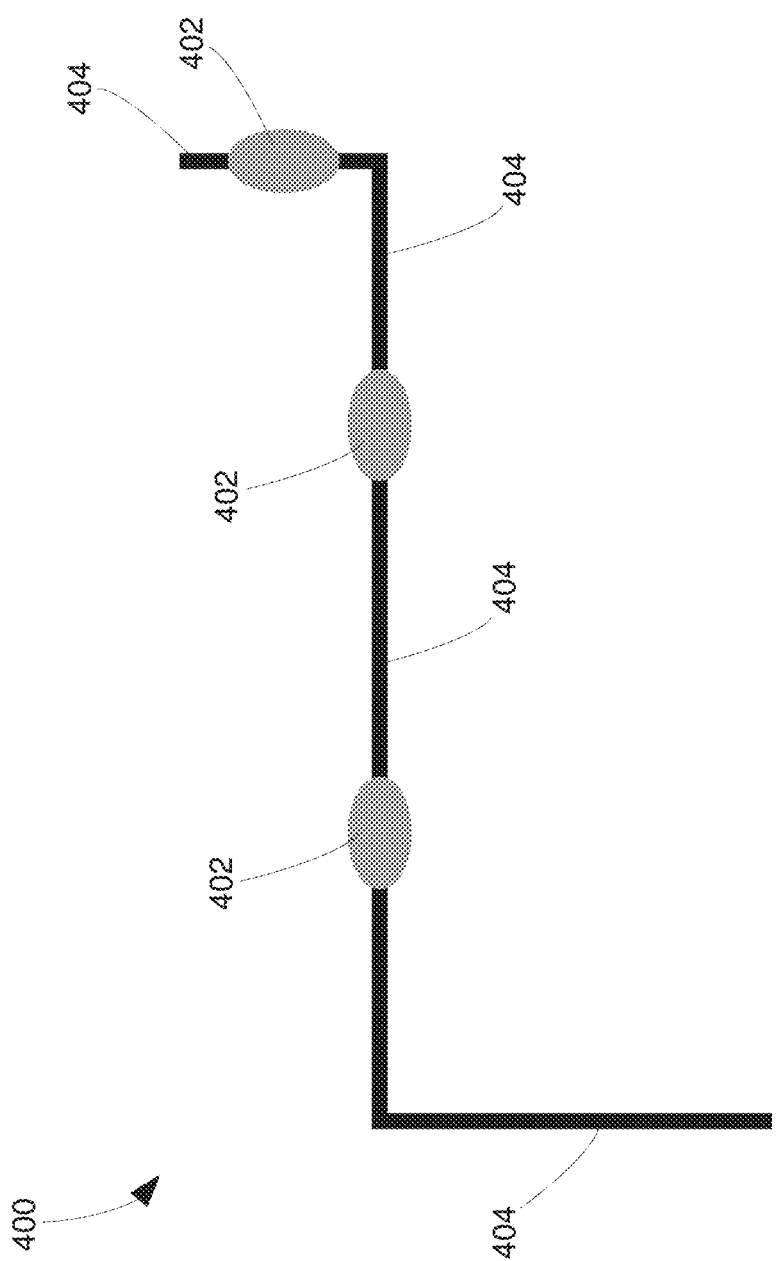
FIG. 4 illustrates an exemplary bus bar formed according to the manufacturing process of FIG. 1.

Referring to FIG. 4, a plan view illustrating an insulated bus bar 400 formed according to the above-described manufacturing process is shown. The bus bar 400 may be formed of a wire that has been cut to a desired length, bent into a desired shaped, and coined to form coined portions 402 that facilitate connection to other electrical components. The bus bar 400 may further include insulated portions 404 that are covered with an electrically insulating coating, sleeve, jacket, etc. The coined portions 402 of the wire may be exposed (i.e., not covered with the electrically insulating coating, sleeve, jacket, etc.). The electrically insulating coating may be formed on the wire using the methods described above. Alternatively, the wire may have a pre-existing electrically insulating coating (e.g., a conventional insulated wire), and the electrically insulating coating may be removed from the portions of the wire that are to be connected to other electrical components (e.g., the coined portions 402).

As shown, the implementations described above facilitate preparation of insulated bus bars with complex shapes for which insulation would be difficult if not impossible to remove using the conventional means described above. Additionally, since the conductive material of the bus bar is formed of wire, the conductive material does not need to be prepared using stamping, cutting, and/or punching processes that are commonly employed in the manufacture of conventional bus bars, such processes typically requiring complex, expensive tooling and design considerations and often producing a great deal of material waste. Instead, the wire of the present disclosed need only be cut and mechanically deformed to achieve a desired shape, which can be performed quickly and inexpensively with little or no material waste.

While the method for manufacturing the insulated bus bar has been described with reference to certain embodiments, it will be understood by those skilled in the art that various changes may be made and equivalents may be substituted without departing from the spirit and scope of the claims of the application. Other modifications may be made to adapt a particular situation or material to the teachings disclosed above without departing from the scope of the claims. For example, the operations described above may be applied equally well to pre-cut conductive material sections and/or assemblies of pre-cut conductive material sections, which may be welded together to provide an assembly of conductive sections, prior to forming an insulating later over the conductive material. Therefore, the claims should not be construed as being limited to any one of the particular embodiments disclosed, but to any embodiments that fall within the scope of the claims.

We claim:

1. A method for manufacturing an insulated conductive material, the method comprising the successive steps of:
    providing a wire;
    coining portions of the wire, whereafter two or more coined portions of the wire are separated by uncoined portions of the wire;
    bending the wire into a predetermined shape;
    applying a masking material to one or more regions of the wire;
    after coining, bending, and masking the wire, coating regions of the wire other than the one or more masked regions with an insulating material by:
        electrically charging the wire with a first charge polarity;
        providing a medium of electrically charged insulating material particles that are charged with an opposite polarity;
        binding the insulating material particles to areas of the conductive material other than the one or more regions by passing the charged wire through the medium of electrically charged insulating material particles; and
        curing the binded insulating material particles; and
    applying a solvent to the masking material to thereby remove the masking material, wherein the cured insulated material particles are substantially unaffected by the solvent.

2. The method according to claim 1, wherein the medium of electrically charged insulating material particles includes insulating colloidal particles suspended in a liquid medium.

3. The method according to claim 1, wherein the provided wire is formed of at least one of copper, a copper alloy, aluminum, nickel silver, and stainless steel.

4. The method according to claim 1, wherein the masking material is an electrically insulating material.

5. The method according to claim 4, wherein the masking material includes at least one of a photoresist material, a polymer material, and a dielectric material.

6. The method according to claim 1, further comprising baking the wire having the applied masking material before coating the wire with the insulating material to thereby cure the masking material.

7. The method according to claim 1, further comprising applying a second solvent to the wire after applying the masking material to thereby remove surface oxidation from the conductive material, wherein the masking material is substantially unaffected by the second solvent.

8. The method according to claim 1, wherein the provided wire has a cross sectional shape that is circular or polygonal.

* * * * *